(12) United States Patent
Kwon et al.

(10) Patent No.: US 10,818,971 B2
(45) Date of Patent: Oct. 27, 2020

(54) LOW POROSITY SOLID ELECTROLYTE MEMBRANE AND METHOD FOR MANUFACTURING THE SAME

(71) Applicants: HYUNDAI MOTOR COMPANY, Seoul (KR); KIA MOTORS CORPORATION, Seoul (KR); ULSAN NATIONAL INSTITUTE OF SCIENCE AND TECHNOLOGY, Ulsan (KR)

(72) Inventors: Oh Min Kwon, Busan (KR); Hong Seok Min, Yongin-si (KR); Yong Sub Yoon, Seoul (KR); Kyung Su Kim, Yongin-si (KR); Dae Yang Oh, Bucheon-si (KR); Yoon Seok Jung, Ulsan (KR); Young Jin Nam, Suwon-si (KR); Sung Hoo Jung, Changwon-si (KR)

(73) Assignees: HYUNDAI MOTOR COMPANY, Seoul (KR); KIA MOTORS CORPORATION, Seoul (KR); ULSAN NATIONAL INSTITUTE OF SCIENCE AND TECHNOLOGY, Ulsan (KR)

(*) Notice: Subject to any disclaimer, the term of this patent is extended or adjusted under 35 U.S.C. 154(b) by 90 days.

(21) Appl. No.: 15/843,631

(22) Filed: Dec. 15, 2017

(65) Prior Publication Data
US 2018/0342768 A1 Nov. 29, 2018

(30) Foreign Application Priority Data
Dec. 16, 2016 (KR) .................. 10-2016-0172370

(51) Int. Cl.
*H01M 10/056* (2010.01)
*H01M 10/0565* (2010.01)
(Continued)

(52) U.S. Cl.
CPC ....... *H01M 10/0565* (2013.01); *B60K 5/1208* (2013.01); *B60K 17/00* (2013.01);
(Continued)

(58) Field of Classification Search
None
See application file for complete search history.

(56) References Cited

U.S. PATENT DOCUMENTS

| | | | |
|---|---|---|---|
| 6,645,675 B1 * | 11/2003 | Munshi ................. | H01B 1/122 252/62.2 |
| 2012/0216394 A1 * | 8/2012 | Kitaura ............... | H01M 10/052 29/623.2 |

(Continued)

FOREIGN PATENT DOCUMENTS

| | | |
|---|---|---|
| JP | 2016-507142 | 3/2016 |
| KR | 10-2013-0000227 | 9/2014 |

(Continued)

*Primary Examiner* — Wojciech Haske
(74) *Attorney, Agent, or Firm* — McDonnell Boehnen Hulbert & Berghoff LLP (57) ABSTRACT

An improved, low porosity, solid electrolyte membrane and a method of manufacturing the solid electrolyte membrane are provided. The low porosity, solid electrolyte membrane significantly improves both mechanical strength and porosity of the membrane, inhibits the growth of lithium dendrites (Li dendrites), and thereby maintains and maximizes electrochemical stability of an all-solid-state battery. This is accomplished by wet-coating a sulfide or oxide solid electrolyte particle with a thermoplastic resin, or a mixture of the thermoplastic resin and a thermosetting resin, using a solvent to prepare a composite and hot-pressing the composite at a relatively low temperature and at a low pressure.

8 Claims, 10 Drawing Sheets

(51) Int. Cl.
*B60K 17/04* (2006.01)
*B60K 17/00* (2006.01)
*B60K 5/12* (2006.01)
*H01M 10/052* (2010.01)
*H01M 10/058* (2010.01)
*H01M 10/48* (2006.01)
*F16H 57/025* (2012.01)
*F16H 57/028* (2012.01)
*H01M 4/62* (2006.01)

(52) U.S. Cl.
CPC ........... *B60K 17/04* (2013.01); *H01M 10/052* (2013.01); *H01M 10/058* (2013.01); *H01M 10/484* (2013.01); *H01M 10/486* (2013.01); *F16H 57/025* (2013.01); *F16H 57/028* (2013.01); *H01M 4/628* (2013.01); *H01M 2300/0082* (2013.01)

(56) References Cited

U.S. PATENT DOCUMENTS

| | | | | |
|---|---|---|---|---|
| 2014/0220408 | A1* | 8/2014 | Agarwal | H01M 4/663 |
| | | | | 429/127 |
| 2015/0147659 | A1* | 5/2015 | Kato | H01M 10/0562 |
| | | | | 429/304 |

FOREIGN PATENT DOCUMENTS

| | | |
|---|---|---|
| KR | 10-2014-0127442 | 3/2015 |
| KR | 10-2014-0144777 | 3/2015 |
| KR | 10-2016-0013631 | 2/2016 |
| KR | 10-1611403 | 4/2016 |

* cited by examiner

LOW POROSITY SOLID ELECTROLYTE MEMBRANE AND METHOD FOR MANUFACTURING THE SAME

CROSS-REFERENCE TO RELATED APPLICATION

This application claims under 35 U.S.C. § 119(a) the benefit of and priority to Korean Patent Application No. 10-2016-0172370 filed on Dec. 16, 2016, the entire contents of which are incorporated herein by reference.

BACKGROUND

Technical Field

The present disclosure relates to an improved low porosity solid electrolyte membrane which significantly improves both mechanical strength and porosity, inhibits growth of lithium dendrites (Li dendrites), and thereby maintains and maximizes electrochemical stability of an all-solid-state battery. This is accomplished by wet-coating a sulfide or oxide solid electrolyte particle with a thermoplastic resin or a mixture of the thermoplastic resin and a thermosetting resin using a solvent to prepare a composite and hot-pressing the composite at a relatively low temperature and at a low pressure.

Background Art

An all-solid-state battery, which is a lithium secondary battery using a solid electrolyte, is a potential candidate for next-generation secondary batteries, which is expected to satisfy both stability and energy density needs, particularly in the automotive industry. In an all-solid-state battery, a solid electrolyte is disposed between a positive electrode and a negative electrode and a current collector is linked to each electrode.

However, like a conventional commercially-available liquid electrolyte-based lithium secondary battery, the all-solid-state battery cannot control the formation of lithium dendrites during the charge/discharge cycles, which may disadvantageously result in a short circuit. When dendrite formation can be controlled in the all-solid-state battery, a high energy density all-solid-state battery can be produced, which serves as a desirable alternative to commercially-available lithium secondary batteries.

Conventional production methods result in porous solid electrolyte membranes that permit dendrite formation and thus result in short circuits. In addition, conventional production methods require hot-pressing the solid electrolyte at high temperatures and thus increases the difficulty and cost of the process.

Thus, there is a need for technologies that can inhibit formation of lithium dendrites—a common problem in all-solid-state batteries using a lithium negative electrode.

The above information disclosed in this Background section is only for enhancement of understanding of the background of the invention and therefore it may contain information that does not form the prior art that is already known to a person of ordinary skill in the art.

SUMMARY OF THE DISCLOSURE

The present disclosure addresses the above-described problems associated with the prior art.

According to the example embodiments described in greater detail herein, when a solid electrolyte membrane is produced by preparing a composite of a solid electrolyte particle and a thermoplastic resin (thermoplastic polymer) and hot-pressing the composite under certain conditions, porosity of the electrolyte membrane is greatly improved, formation of lithium dendrites is inhibited, and cell cycle (life) is thus improved.

Accordingly, in one aspect, the present disclosure provides a solid electrolyte membrane which can inhibit formation of lithium dendrites based on controlled pore formation.

In another aspect, the disclosure provides a method of manufacturing the solid electrolyte membrane.

In an example embodiment, a solid electrolyte membrane is obtained by hot-pressing a sulfide or oxide solid electrolyte particle coated with a polymer film, wherein the polymer film comprises at least one thermoplastic resin selected from the group consisting of polymethyl methacrylate ("PMMA"), polystyrene ("PS") and polyester resins, or a mixture of the thermoplastic resin with at least one thermosetting resin selected from acrylonitrile-butadiene rubber ("NBR"), an epoxy resin and an unsaturated ester resin. In an alternative embodiment, the combination of these compounds may also include a cross-linkable compound or a reaction product thereof.

In another example embodiment, a method of manufacturing a solid electrolyte membrane includes: (a) mixing a sulfide or oxide solid electrolyte particle with a thermoplastic resin, or a mixture of the thermoplastic resin and a thermosetting resin, and a solvent capable of dissolving the resin and wet-coating the resulting mixture; (b) removing the solvent by drying to prepare a solid electrolyte composite; and (c) hot-pressing the solid electrolyte composite to produce a solid electrolyte membrane.

Other aspects and example embodiments are discussed below.

BRIEF DESCRIPTION OF THE DRAWINGS

The above and other features of the present disclosure will now be described in detail with reference to certain example embodiments thereof as shown in the accompanying drawings described hereinbelow, and which are provided by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, various example embodiments are described in detail in conjunction with the accompanying drawings. It will be understood that the present description is not intended to limit the invention to those example embodiments. On the contrary, the invention is intended to cover not only the example embodiments, but also various alternatives, modifications, equivalents and other embodiments, which may be included within the spirit and scope of the invention as defined by the appended claims.

Figure 1:
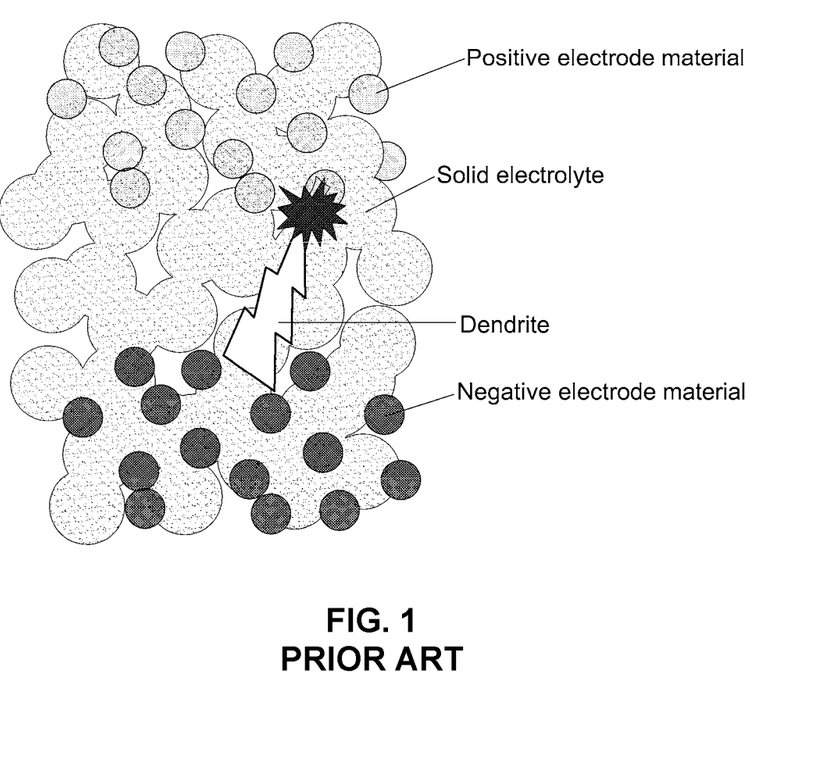
FIG. 1 is a schematic diagram illustrating a conventional solid electrolyte membrane experiencing lithium dendrite formation.
Figure 2:
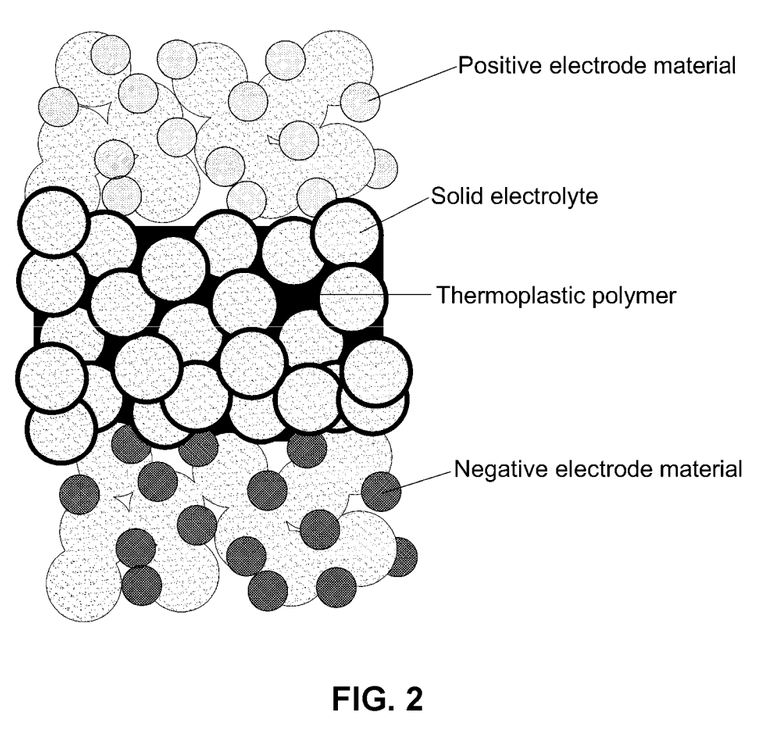
FIG. 2 is a schematic diagram illustrating an example embodiment of an improved solid electrolyte membrane in accordance with the disclosure.

FIG. 1 is a schematic diagram illustrating the structure of a conventional solid electrolyte membrane, as assembled into a battery. In a conventional method for making the solid electrolyte membrane, a solid electrolyte membrane is produced by compressing sulfide or oxide solid electrolyte particles at a high pressure and at a high temperature. In this process, a large number of pores are formed, and lithium dendrites form in the pores of the electrolyte membrane during battery charge/discharge cycles. Because of lithium dendrite formation, disadvantageously, short circuits readily occur. In addition, this method for producing the conventional solid electrolyte membrane is limited in its ability to control certain physical properties of the membrane, such as brittleness. Moreover, manufacturing a solid electrolyte membrane at a relatively high temperature (e.g. 200° C. or higher) is more difficult and costly in commercial settings.

The present disclosure addresses these issues by providing an electrolyte membrane formed by wet-coating a sulfide or oxide solid electrolyte particle with a thermoplastic resin, or a mixture of the thermoplastic resin and a thermosetting resin, to prepare a solid electrolyte composite and then hot-pressing the solid electrolyte composite. Wet-coating using a thermoplastic resin, or a mixture of the thermoplastic resin and a thermosetting resin, advantageously allows hot-pressing at a relatively low temperature of 100° C. In addition, dendrite formation of dendrites is inhibited during cell charge/discharge cycles due to the controlled porosity of the solid electrolyte membrane, and cell cycle (life) is thus significantly improved.

The thermoplastic resin preferably includes one or more compounds selected from the group consisting of PMMA, PS and polyester resins. In addition, the thermosetting resin preferably includes one or more compounds selected from the group consisting of an NBR, an epoxy resin and an unsaturated ester resin, and monomers thereof. The thermoplastic and thermosetting resins may include all candidates that can be dissolved in a non-polar solvent or the like that has no or minimum reactivity with a sulfide solid electrolyte.

While the thermoplastic resin may be used alone, physical properties such as brittleness can be improved when it is used in combination with a thermosetting resin.

In embodiments where the thermoplastic resin is used alone without a thermosetting resin, the solid electrolyte membrane comprises from about 70 to about 98% by weight of the sulfide or oxide solid electrolyte particle and from about 2 to about 30% by weight of the thermoplastic resin, more preferably, from about 2 to about 20% by weight. When the thermoplastic resin is used in an amount less than 2% by weight, it is difficult to control the porosity of the membrane, and when the thermoplastic resin is used in an amount exceeding 30% by weight, it is difficult to achieve low ionic conductivity.

In embodiments where the thermoplastic resin is used in combination with a thermosetting resin, the solid electrolyte membrane comprises from about 65 to about 97% by weight of the sulfide or oxide solid electrolyte particle, from about 2 to about 30% by weight of the thermoplastic resin, and from about 1 to about 5% by weight of the thermosetting resin. When the thermosetting resin is used in an amount less than 1% by weight, there is limited improvement of the physical properties of the thermoplastic resin, and when the thermosetting resin is used in an amount exceeding 5% by weight, there is difficulty controlling the formation of pores due to the influence of the thermosetting resin on the physical properties of the thermoplastic resin. Preferably, the thermosetting resin is used in an amount of from about 2 to about 20% by weight.

Representative non-limiting examples of the sulfide solid electrolyte particle according to the present disclosure include $Li_3PS_4$ and compounds having a composition of $aLi_2S-b(GeS_2)-cP_2S_5-dLiX$, where X is a halide element such as Cl, Br, or I (e.g. $Li_{10}GeP_2S_{12}$). A solid electrolyte having a composition of iodine-substituted $Li_6PS_5Cl$ may also be used. In addition, any other well-known solid electrolyte may be used without limitation.

Hot-pressing is preferably conducted at a temperature of from about 100 to about 240° C. (i.e. at a temperature equal to or higher than the glass transition temperature and lower than the melting point of the thermoplastic resin), and at a pressure of from about 200 to about 500 Mpa. For greater efficiency, hot-pressing is preferably conducted at a temperature of from about 100 to about 220° C. and a pressure of form about 200 to about 400 Mpa. These conditions are determined by considering the physical properties of the thermoplastic resin. An example is shown in the Test Example described later.

The present disclosure also provides a method of manufacturing a solid electrolyte membrane comprising the steps of: (a) mixing a sulfide or oxide solid electrolyte particle with a thermoplastic resin, or a mixture of the thermoplastic resin and a thermosetting resin, and a solvent capable of dissolving the resin, and wet-coating the resulting mixture, (b) removing the solvent by drying to prepare a solid electrolyte composite and (c) hot-pressing the solid electrolyte composite to produce a solid electrolyte membrane.

The thermoplastic resin preferably includes one or more compounds selected from the group consisting of PMMA, PS and polyester resins. In addition, the thermosetting resin preferably includes one or more compounds selected from the group consisting of an NBR, an epoxy resin and an unsaturated ester resin, and monomers thereof. The thermoplastic and thermosetting resins may include all candidates that can be dissolved in a non-polar solvent or the like that has no or minimum reactivity with a sulfide solid electrolyte.

In step (a), in embodiments where the thermoplastic resin is used alone without a thermosetting resin (i.e. where the composition comprises from about 70 to about 98% by weight of the sulfide or oxide solid electrolyte particle and from about 2 to about 30% by weight of the thermoplastic resin, and the total weight percent of the composition is considered as 100 parts by weight), the solvent can be used in an amount of from about 10 to about 100 parts by weight, but is preferably from about 30 to about 50 parts by weight to maximize the uniformity of the coating. The solvent includes one or more non-polar solvents selected from the group consisting of toluene and xylene, and dissolves only the thermoplastic or thermosetting resin while not reacting with the solid electrolyte particle.

When the thermoplastic resin is used in combination with the thermosetting resin (i.e. the composition comprises from about 65 to about 97% by weight of the sulfide or oxide solid electrolyte particle, from about 2 to about 30% by weight of the thermoplastic resin and from about 1 to from about 5% by weight of the thermosetting resin, and the total weight percent of the composition is considered as 100 parts by weight), in step (a), the solvent is used in an amount of from about 10 to about 100 parts by weight but is preferably from about 30 to about 50 parts by weight for maximizing uniformity of coating.

The hot-pressing of step (c) is conducted at a temperature of from about 100 to about 240° C. (i.e. a temperature equal to or higher than the glass transition temperature and lower than a melting point of the thermoplastic resin), and at a pressure of from about 200 to about 500 Mpa.

Using a thermoplastic resin and a thermosetting resin in the solid electrolyte membrane and the method of manufacturing the same as described by reference to the example embodiments in the present disclosure results in the electrolyte membrane having a low porosity. This inhibits the formation of lithium dendrites, suppresses the generation of short circuits, offers electrochemically stable operation of cells, enables manufacture at low process temperatures advantageous for commercial settings, and easily provides an all-solid-state battery with a high energy density.

Examples of the embodiments described above, and test results using those embodiments, are provided below. However, the examples are provided only for illustrative purposes and the scope of the disclosure is not limited to the examples.

Comparative Example and Example: Production of Solid Electrolyte Membrane

In accordance with the composition and content shown in the following Table 1, solid electrolyte particles were wet-coated. Then, the solid electrolyte particles were dried at a high temperature (i.e. the boiling point or higher of the solvent) and under vacuum to prepare a solid electrolyte composite. The solid electrolyte composite was hot-pressed at a temperature of 105° C. and at a pressure of 200 Mpa to produce a solid electrolyte membrane. As a control group, a solid electrolyte membrane on which hot-pressing was not conducted was also produced.

Test Example 1: Measurement of Thickness, Ionic Conductivity and Porosity

Figure 3:
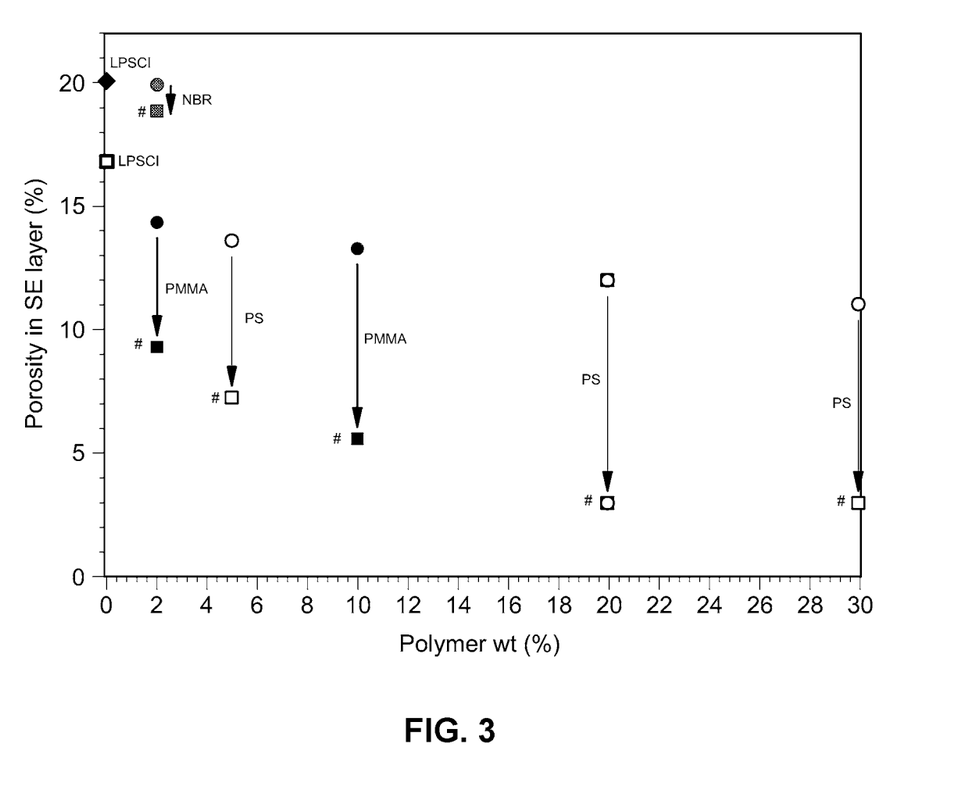
FIG. 3 is a graph showing porosity of the solid electrolyte membrane as a function of polymer weight in an example embodiment.

The thickness, conductivity and porosity of solid electrolyte membranes produced in Comparative Example and Example were measured and the results are shown in the following Table 1. FIG. 3 is a graph showing the porosity variation depending on the amount of thermoplastic resin used in the electrolyte composite.

TABLE 1

| Item | Solid electrolyte particle (% by weight) | Thermoplastic resin (% by weight) | Solvent* (parts by weight) | Hot pressing | Thickness (μm) | Conductivity (S/cm) | Porosity (%) |
|---|---|---|---|---|---|---|---|
| Comparative Example 1 | $Li_6PS_3Cl$ (100% by weight) | — | | x | 730 | $3.80 \times 10^{-3}$ | 16.80 |
| Comparative Example 2 | $Li_6PS_3Cl$ (100% by weight) | — | | x | 800 | $3.65 \times 10^{-3}$ | 23.76 |
| Comparative Example 3 | $Li_6PS_3Cl$ (98% by weight) | PMMA (2% by weight) | 100 | x | 720 | $3.18 \times 10^{-3}$ | 14.33 |
| Example 1 | $Li_6PS_3Cl$ (98% by weight) | PMMA (2% by weight) | 100 | ○ | 680 | $3.40 \times 10^{-3}$ | 9.29 |
| Comparative Example 4 | $Li_6PS_3Cl$ (98% by weight) | NBR (2% by weight) | 100 | x | 770 | $1.72 \times 10^{-3}$ | 19.90 |
| Example 2 | $Li_6PS_3Cl$ (98% by weight) | NBR (2% by weight) | 100 | ○ | 760 | $2.89 \times 10^{-3}$ | 18.84 |
| Comparative Example 5 | $Li_6PS_3Cl$ (95% by weight) | PS (5% by weight) | 100 | x | 730 | $2.40 \times 10^{-3}$ | 13.60 |
| Example 3 | $Li_6PS_3Cl$ (95% by weight) | PS (5% by weight) | 100 | ○ | 680 | $2.81 \times 10^{-3}$ | 7.25 |

TABLE 1-continued

| Item | Solid electrolyte particle (% by weight) | Thermoplastic resin (% by weight) | Solvent* (parts by weight) | Hot pressing | Thickness (μm) | Conductivity (S/cm) | Porosity (%) |
|---|---|---|---|---|---|---|---|
| Comparative Example 6 | $Li_6PS_3Cl$ (90% by weight) | PMMA (10% by weight) | 100 | x | 740 | $2.20 \times 10^{-3}$ | 13.26 |
| Example 4 | $Li_6PS_3Cl$ (90% by weight) | PMMA (10% by weight) | 100 | o | 680 | $2.33 \times 10^{-3}$ | 5.61 |
| Comparative Example 7 | $Li_6PS_3Cl$ (80% by weight) | PS (20% by weight) | 100 | x | 730 | $2.40 \times 10^{-3}$ | 12.40 |
| Example 5 | $Li_6PS_3Cl$ (80% by weight) | PS (20% by weight) | 100 | o | 680 | $2.81 \times 10^{-3}$ | 3.10 |
| Comparative Example 8 | $Li_6PS_3Cl$ (70% by weight) | PS (30% by weight) | 100 | x | 720 | $2.40 \times 10^{-3}$ | 11.20 |
| Example 6 | $Li_6PS_3Cl$ (70% by weight) | PS (30% by weight) | 100 | o | 680 | $2.81 \times 10^{-3}$ | 3.02 |

*represents the amount of a solvent obtainable when the total weight percent of a combination of the solid electrolyte particle and the thermoplastic resin is considered as 100 parts by weight As can be seen from Table 1 and FIG. 3, when hot-pressing is conducted using a solid electrolyte particle, and PMMA or PS as the thermoplastic resin, conductivity is improved and porosity is reduced as compared to the control samples where no hot-pressing was used. However, it can be seen that addition of an NBR thermosetting resin exerts limited control on porosity. This suggests that the thermoplastic resin and hot-pressing are essential factors in controlling the formation of pores in the sulfide solid electrolyte.

Test Example 2: Confirmation of Inhibition of Formation of Lithium Dendrites Performance testing (current: 0.2 C) was conducted on a cell including $TiS_2$ as a positive electrode and an Li metal negative electrode ($TiS_2$:LPS=1:2), and having 150 mg of LPS as an electrolyte layer, or a solid electrolyte membrane according to Example 1. For purposes of this example, LPS is defined as $75Li_2S$-$25P_2S_5$-based glass-ceramic. LPS (400 mesh) means a very fine particle screened on 400 mesh and LPS (400 mesh-X) means a very large particle not screened on 400 mesh. Test results are shown in FIG. 4.

Figure 4:
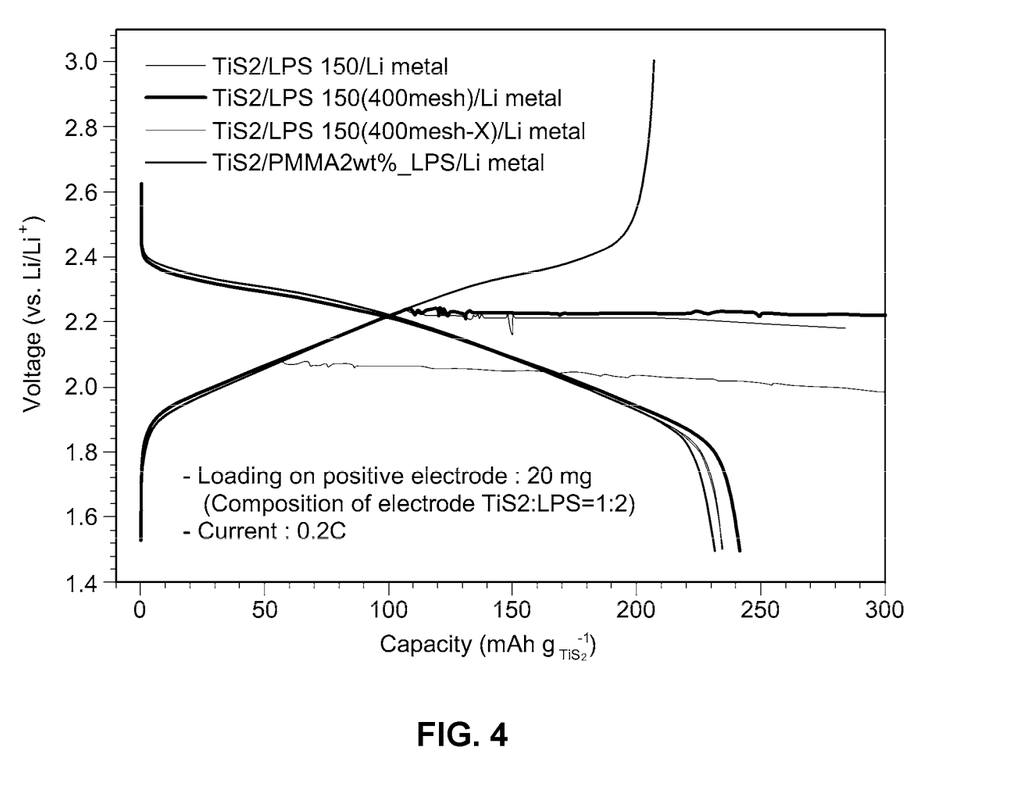
FIG. 4 is a graph illustrating voltage as a function of capacity, and demonstrating inhibition of lithium dendrite formation using an example embodiment of the improved solid electrolyte membrane according to the present disclosure.

As can be seen from FIG. 4, the cell including the solid electrolyte membrane of Example 1 does not short-circuit, whereas all of the conventional cells using LPS and not including the solid electrolyte membrane of Example 1 short-circuit.

Test Example 3: Cell Performance Testing

Figure 5:
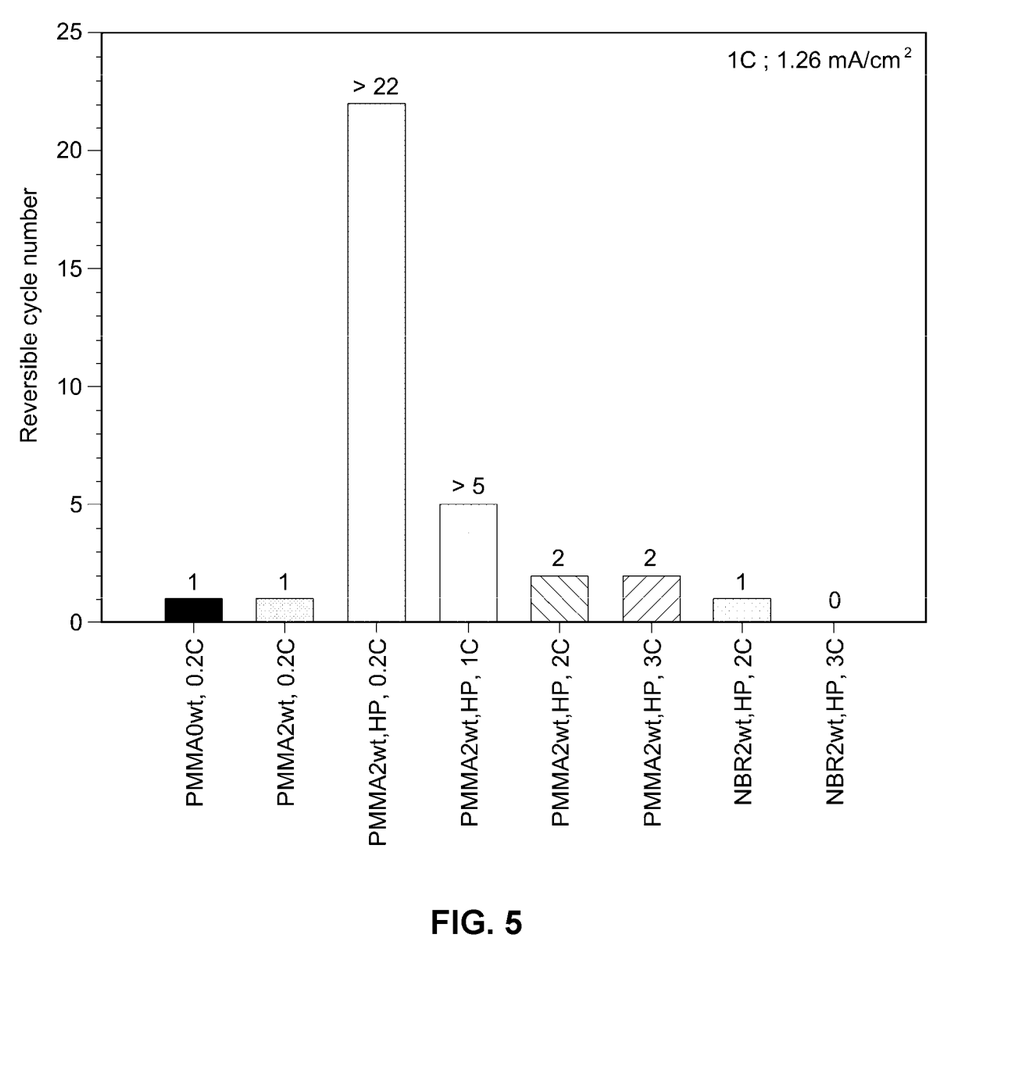
FIG. 5 is a graph illustrating cell performance testing results as a function of the thermoplastic resin, hot-pressing and current.

In order to ascertain the influences of the thermoplastic resin, hot-pressing and current on inhibition of lithium dendrites, cycle life was measured on all-solid-state batteries including the solid electrolyte membranes produced in Comparative Example and Example shown in Table 1 and the results are shown in FIG. 5.

As can be seen from FIG. 5, the cell including the solid electrolyte membrane of Example 1 exhibits a considerably improved cycle life of 20 or more at a current of 0.2 C.

Test Example 4: Cell Performance Testing as a Function of the Amount of Thermoplastic Resin Used Performance testing (current: 0.2 C) was conducted on cells including $TiS_2$ as a positive electrode and an Li metal negative electrode ($TiS_2$:LPS=1:2), and including the solid electrolyte membranes of Examples 1 and 4, and the solid electrolyte membranes of Examples 7 and 8. Examples 7 and 8 were prepared as in Example 1, except that PMMA is used in an amount of 20% by weight in Example 7 and 30% by weight in Example 8. Test results are shown in FIG. 6.

Figure 6:
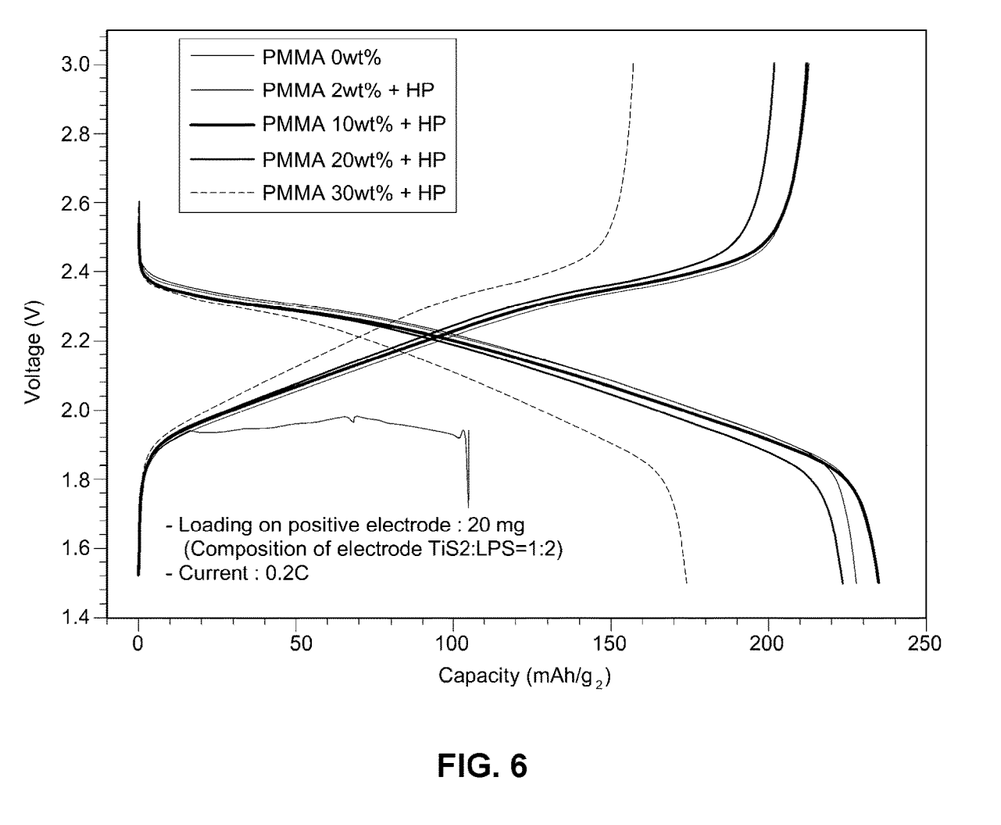
FIG. 6 is a graph illustrating voltage as a function of capacity for a range of thermoplastic resin amounts used in an example embodiment of the improved solid electrolyte membrane according to the present disclosure.

As can be seen from FIG. 6, as the percentage (%) by weight of PMMA increases, over-voltage of cell performance is observed. This means that the ionic conductivity of the solid electrolyte composite decreases. The preferred amount of PMMA defined in the present invention is from about 5 to about 20% by weight and the optimum weight of the thermoplastic resin may be varied depending on the composition and particle size of the solid electrolyte.

Accordingly, the amount of thermoplastic resin used is preferably from about 2 to about 30% by weight, more preferably from about 2 to about 20% by weight.

Test Example 5: Pressure Effects

For the solid electrolyte membrane of Example 9 (prepared as in Example 1, except that PMMA is used in an amount of 5% by weight), porosity was measured at different pressures using a press through the pellet thickness and density of the solid electrolyte. Test results are shown in FIG. 7.

Figure 7:
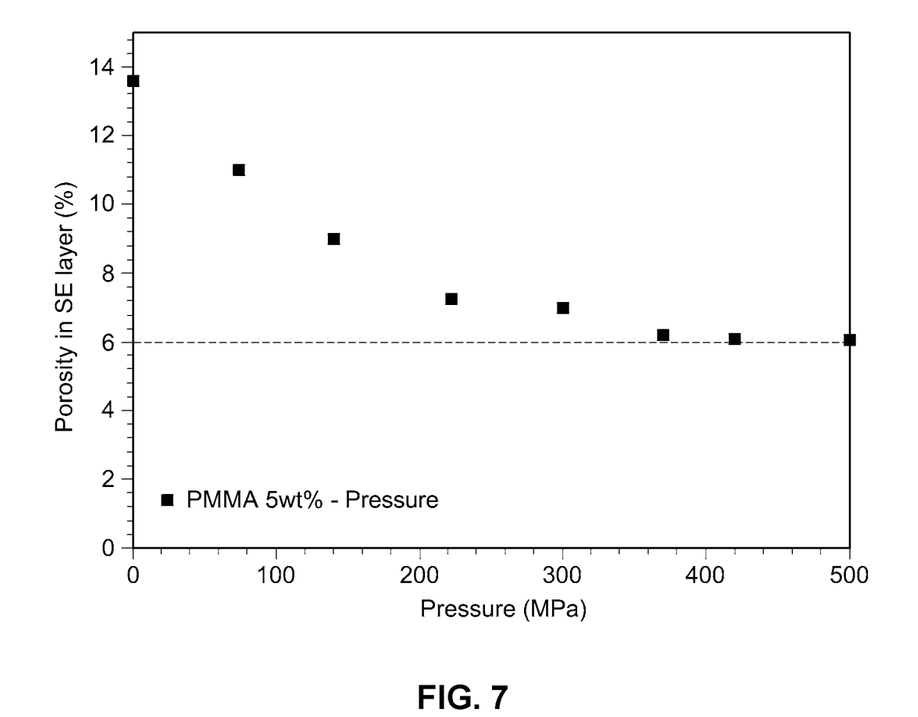
FIG. 7 is a graph showing porosity as a function of pressure in an example embodiment of the improved solid electrolyte membrane according to the present disclosure.

As can be seen from FIG. 7, when hot-pressing is conducted at a pressure of from about 200 to about 500 Mpa, porosity of the electrolyte membrane decreases. For optimum efficiency, the pressure used should be preferably from about 200 to about 400 Mpa.

Test Example 5: Temperature Effects

Figure 8:
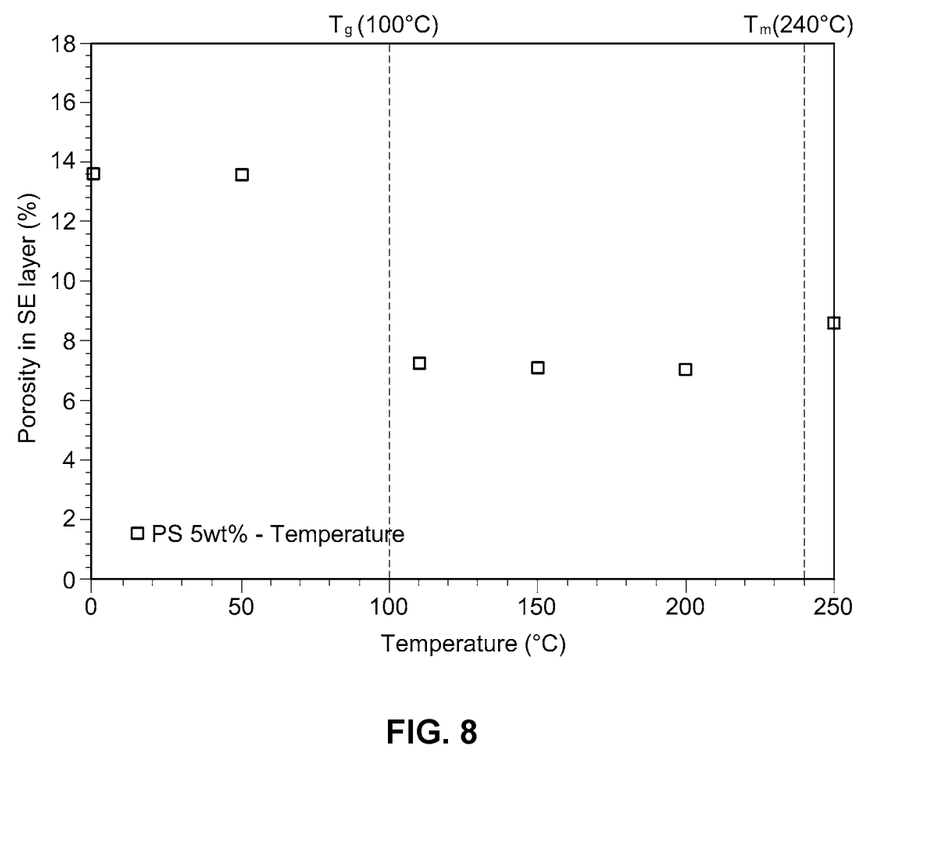
FIG. 8 is a graph showing porosity as a function of temperature in an example embodiment of the improved solid electrolyte membrane according to the present disclosure.

The porosity of the solid electrolyte membrane of Example 3 was measured at different temperatures using hot-press equipment and test results are shown in FIG. 8.

As can be seen from FIG. 8, when hot-pressing is conducted at a temperature of from about 100 to about 240° C., and more preferably from about 100 to about 220° C., the porosity of the electrolyte membrane decreases. For optimum effects, the temperature used in manufacturing the improved electrolyte membranes according to the disclosure is preferably greater than or equal to the glass transition temperature ($T_g$) of the thermoplastic resin and is less than or equal to the melting point ($T_m$) of the thermoplastic resin.

Test Example 6: Porosity and Cell Performance Testing as a Function of the Amount of Thermosetting Resin Added In accordance with the composition and content shown in the following Table 2, the solid electrolyte particle was wet-coated. The solid electrolyte particle was dried under the same conditions as in Example to prepare a solid electrolyte composite, and the solid electrolyte composite was hot-pressed at a temperature of 105° C. and at a pressure of 200 Mpa to produce a solid electrolyte membrane.

TABLE 2

| Item | Solid electrolyte particle (% by weight) | Thermoplastic resin (% by weight) | Thermosetting resin (% by weight) | Solvent* (parts by weight) | Hot pressing | Thickness (μm) | Conductivity (S/cm) | Porosity (%) |
|---|---|---|---|---|---|---|---|---|
| Example 3 | $Li_6PS_3Cl$ (95% by weight) | PS (5% by weight) | — | 100 | ○ | 680 | $2.81 \times 10^{-3}$ | 7.25 |
| Example 10 | $Li_6PS_3Cl$ (95% by weight) | PS (5% by weight) | Epoxy (1% by weight) | 100 | ○ | 680 | $2.60 \times 10^{-3}$ | 7.51 |
| Example 11 | $Li_6PS_3Cl$ (95% by weight) | PS (5% by weight) | Epoxy 3% by weight) | 100 | ○ | 690 | $1.40 \times 10^{-3}$ | 8.03 |
| Example 12 | $Li_6PS_3Cl$ (95% by weight) | PS (5% by weight) | Epoxy (5% by weight) | 100 | ○ | 720 | $8.70 \times 10^{-4}$ | 9.56 |
| Comparative Example 9 | $Li_6PS_3Cl$ (95% by weight) | PS (5% by weight) | Epoxy (10% by weight) | 100 | ○ | 760 | $6.20 \times 10^{-4}$ | 12.4 |

*represents the amount of a solvent obtainable when the total weight percent of a combination of the solid electrolyte particle, the thermoplastic resin, and the thermosetting resin is considered as 100 parts by weight.

For the solid electrolyte membranes prepared in Example 3, and Examples 10 to 13, porosity was measured using a press through the pellet thickness and density of the solid electrolyte. Test results are shown in FIGS. 9 and 10.

Figure 9:
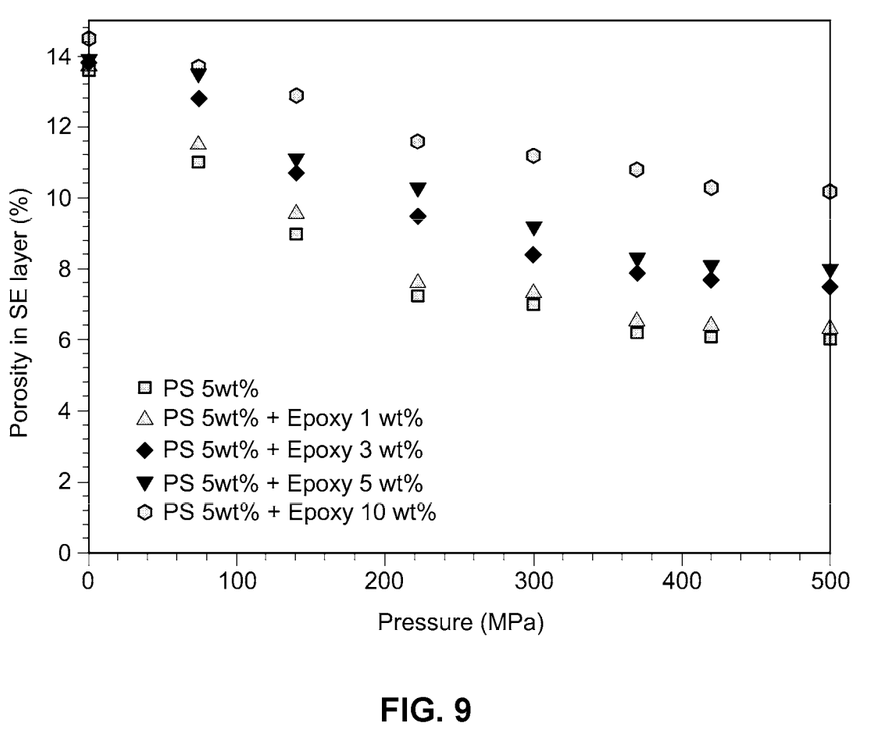
FIG. 9 is a graph showing porosity as a function of the amount of thermosetting resin added in an example embodiment of the improved solid electrolyte membrane according to the present disclosure.
Figure 10:
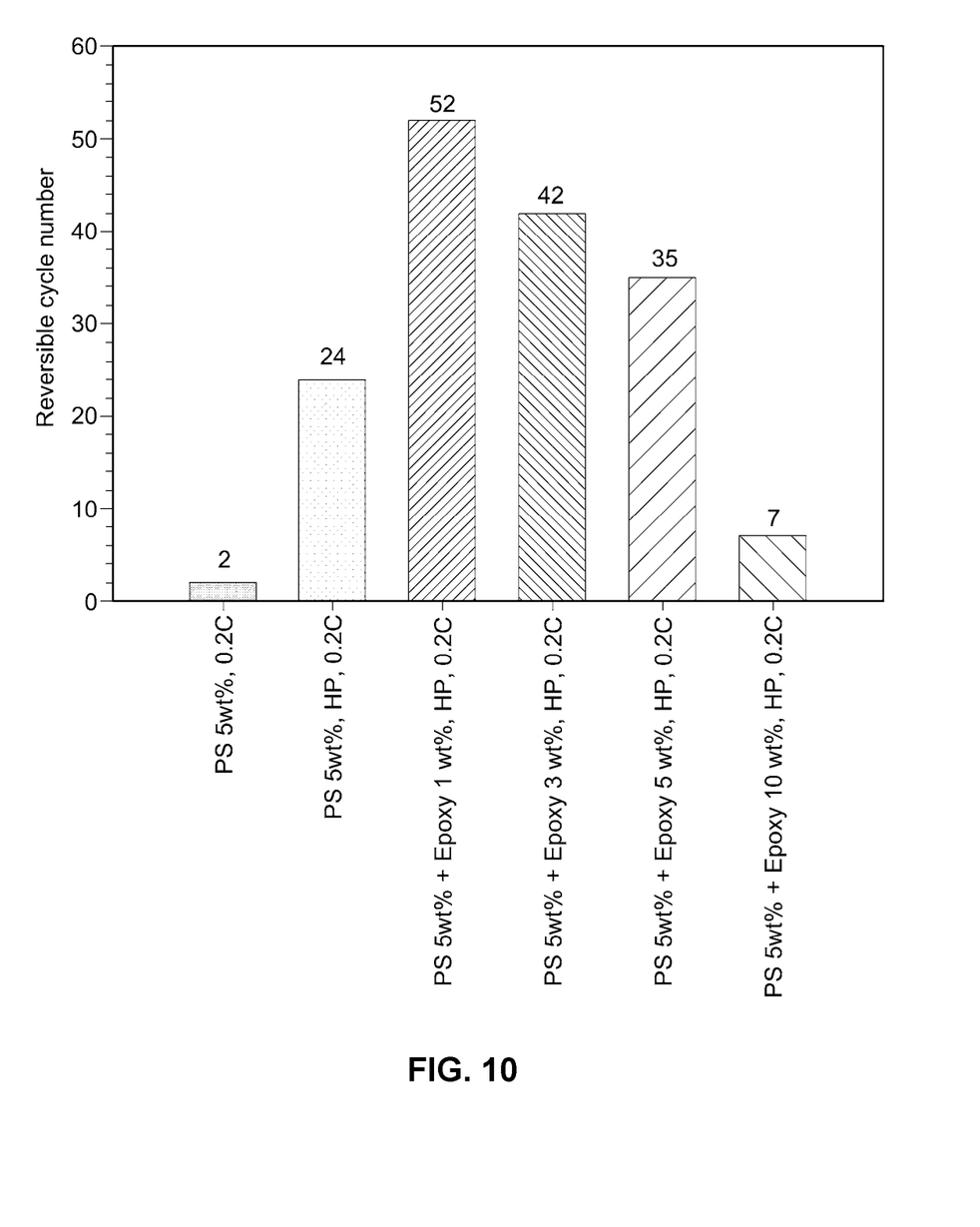
FIG. 10 shows results of cell performance testing depending on the amount of thermosetting resin added in an example embodiment of the improved solid electrolyte membrane according to the present disclosure.

As can be seen from FIGS. 9 and 10, when the thermosetting resin is used in an amount of from about 1 to about 5% by weight, with respect to the weight of the thermoplastic resin, low porosity of the electrolyte membrane is achieved.

Accordingly, the example embodiments of the polymer electrolyte membranes as described in the present disclosure, which are manufactured by wet-coating a sulfide or oxide solid electrolyte particle with from about 2 to about 30% by weight of a thermoplastic resin and from about 1 to about 5% by weight of a thermosetting resin, and hot-pressing the resulting solid electrolyte particle at a low temperature and at a low pressure, reduce the porosity of the electrolyte membrane, thereby inhibiting the formation of lithium dendrites and providing a stably operated all-solid-state battery.

As apparent from the foregoing, the solid electrolyte membrane described herein achieves reduced porosity by using a thermoplastic resin, thereby inhibiting the generation of short circuits, allowing cells to stably electrochemically operate, preventing the formation of lithium dendrites to improve cell cycle life, and easily providing an all-solid-state battery with a high energy density. In addition, because the membrane can be manufactured at low process temperatures, the manufacturing process is less costly.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a solid electrolyte membrane comprising:
   (a) mixing a solid electrolyte particle with at least one thermoplastic resin, at least one thermosetting resin, and a solvent to form a solid electrolyte mixture;
   (b) removing the solvent from the solid electrolyte mixture by drying to prepare a solid electrolyte composite; and
   (c) hot-pressing the solid electrolyte composite;
   wherein the solid electrolyte mixture comprises an amount of about 65 wt % to about 97 wt % of the solid electrolyte particle, an amount of about 2 wt % to about 30 wt % of the thermoplastic resin, and an amount of about 1 wt % to 5 wt % of the thermosetting resin, all the wt % based on the total weight of the solid electrolyte mixture.

2. The method of claim 1, wherein the solvent is capable of dissolving the resin and wet-coating the resulting mixture.

3. The method of claim 1, wherein the solid electrolyte particle is a sulfide or an oxide solid electrolyte particle.

4. The method of claim 1, wherein the thermoplastic resin is selected from the group consisting of polymethyl methacrylate, polystyrene and polyester resins.

5. The method of claim 1, wherein the thermosetting resin is selected from the group consisting of an acrylonitrile-butadiene rubber, an epoxy resin and an unsaturated ester resin.

6. The method of claim 1, wherein the solid electrolyte mixture comprises from about 5 to about 50 weight percent solvent.

7. The method of claim 1, wherein the solid electrolyte mixture comprises from about 5 to about 50 weight percent solvent.

8. The method of claim 1, wherein the hot-pressing is carried out at a temperature of from about 100 to about 240° C. and at a pressure of from about 200 to about 500 Mpa.

* * * * *